(12) United States Patent
Takaki et al.

(10) Patent No.: US 6,724,819 B1
(45) Date of Patent: Apr. 20, 2004

(54) MOVING PICTURE TRANSMISSION APPARATUS, MOVING PICTURE RECEPTION APPARATUS, AND MOVING PICTURE DATA RECORD MEDIUM

(75) Inventors: Toshimasa Takaki, Tokyo (JP); Akino Inoue, Tokyo (JP); Toshio Oka, Tokyo (JP)

(73) Assignee: Matsushitas Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/539,152

(22) Filed: Mar. 30, 2000

(30) Foreign Application Priority Data

Apr. 2, 1999 (JP) .......................................... 11-096326

(51) Int. Cl.$^7$ .............................. H04N 7/12; G06K 9/36
(52) U.S. Cl. ................ 375/240.12; 382/236; 348/394.1
(58) Field of Search ...................... 375/240.12, 240.13, 375/240.15, 240.16, 240.27; 348/412.1, 394.1, 409.1, 466, 616, 615; 382/236, 252; 714/747

(56) References Cited

U.S. PATENT DOCUMENTS 5,436,664 A * 7/1995 Henry ................... 375/240.16
5,442,400 A * 8/1995 Sun et al. .............. 375/240.15
5,724,369 A * 3/1998 Brailean et al. ............ 714/747
5,761,343 A * 6/1998 Haruma et al. ............. 382/236

OTHER PUBLICATIONS

Niko Farber, Eckehard Steinbach and Bern Girod, "Robust H.263 Compatible Transmission for Mobile Video Server Access", Telecommunications Institute, University of Erlangen–Nuremberg, Sep. 1996, pp. 8–13.

Shigeru Fukunaga, Toshihisa Nakai and Hiroshi Inoue, "Error Resilient Video Coding by Dynamic Replacing of Reference Pictures", Kansai Lab., R&D Group, Oki Electric Ind. Co., Ltd., Nov. 1996, pp. 1503–1508.

* cited by examiner

Primary Examiner—Gims Philippe
(74) Attorney, Agent, or Firm—Pearne & Gordon LLP (57) ABSTRACT

In a moving picture data structure having a structure comprising I pictures (intraframe coded image) and P pictures (interframe forward predictive coded image), a P' picture of a forward predictive coded image of a picture immediately preceding an I picture and the I picture is placed following the I picture. If an error occurs during the I picture transmission, the P' picture can be used to recover from the error.

10 Claims, 10 Drawing Sheets

MOVING PICTURE TRANSMISSION APPARATUS, MOVING PICTURE RECEPTION APPARATUS, AND MOVING PICTURE DATA RECORD MEDIUM

BACKGROUND OF THE INVENTION

This invention relates to error recovery at the moving picture transmission time in a network where an error is not negligible.

Hitherto, a method wherein a moving picture transmission apparatus provides redundant data for error recovery and when an error occurs in a moving picture reception apparatus, the redundant data is used to recover from the error has been known as an error recovery method applied when moving picture data stored in the moving picture transmission apparatus is transferred to the moving picture reception apparatus over a transmission line.

Generally, moving picture data can be assumed to consist of a plurality of still images successive in time sequence. In an MPEG image compression technique, the moving picture data consists of I picture (intraframe coded image), P picture (interframe forward predictive coded image), and B picture (bidirectional predictive coded image), and redundancy in the time direction of the moving picture data is reduced. To enable a random jump, an I picture appears periodically. Such a structure is useful for a system such as a VOD (video on demand) system.

Figure 10:
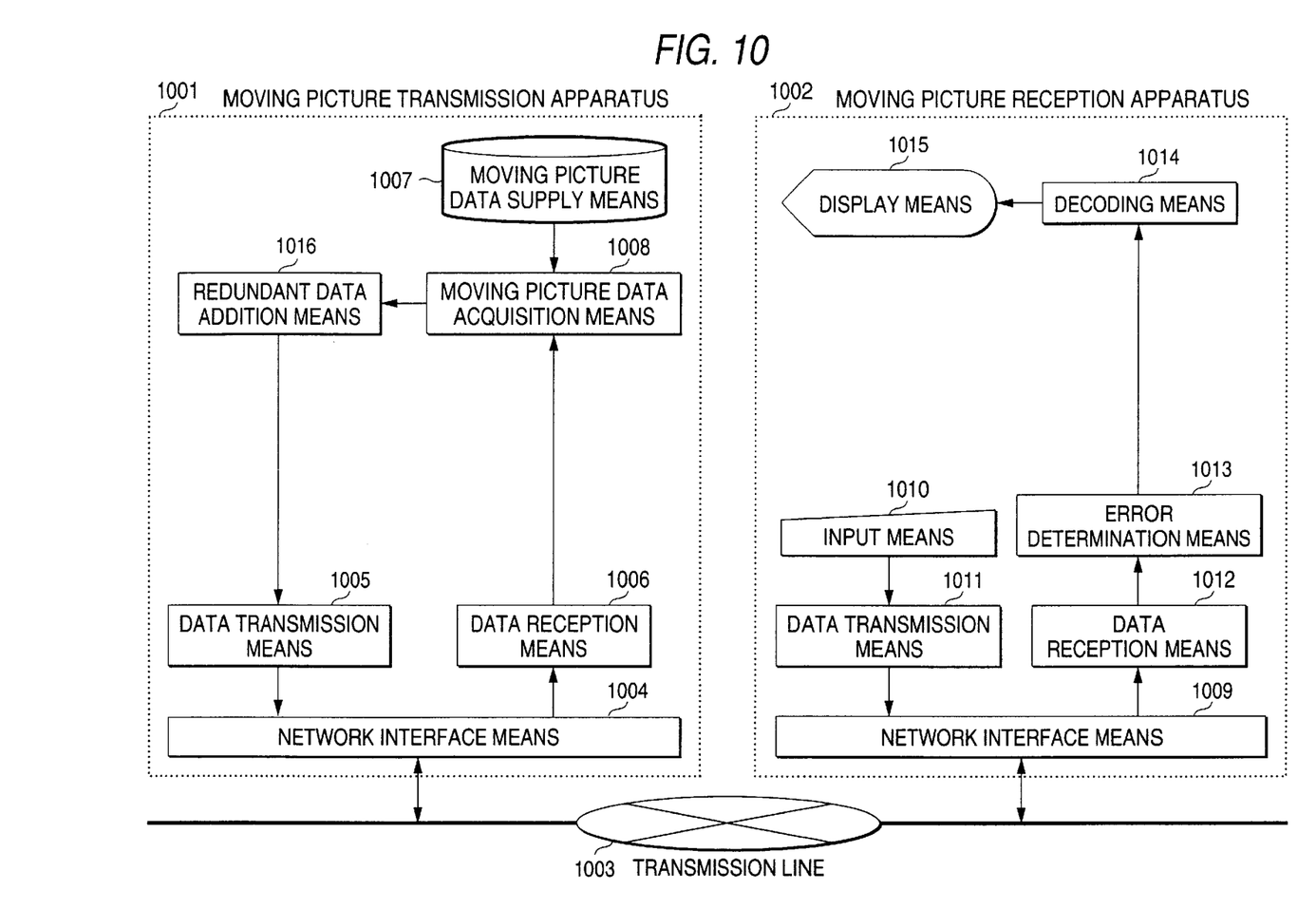
FIG. 10 is a block diagram to show the configuration of a moving picture transmission system in a related art.

FIG. 10 shows an example of a system using an error recovery method in moving picture transmission in a related art. A moving picture transmission apparatus 1001 comprises network interface means 1004, data transmission means 1005, data reception means 1006, moving picture supply means 1007 for supplying a moving picture, moving picture data acquisition means 1008 for acquiring object data, and redundant data addition means 1016 for adding redundant data. A moving picture reception apparatus 1002 comprises network interface means 1009, data transmission means 1011, data reception means 1012, input means 1010 for making a request for the reproduction state of a moving picture, error determination means 1013 for determining an error, decoding means 1014 for decoding moving picture data into a format in which the moving picture data can be displayed, and display means 1015 for displaying a moving picture.

In the system, when the user enters a command through the input means 1010 of the moving picture reception apparatus 1002, the command is sent through the data transmission means 1011, the network interface means 1009, a transmission line 1003, the network interface means 1004 of the moving picture transmission apparatus 1001, and the data reception means 1006 to the moving picture data acquisition means 1008, which then acquires objective moving picture data from the moving picture supply means 1007 in accordance with the command. The redundant data addition means 1016 adds redundant data to the acquired moving picture data so as to send all frames or I pictures doubly. Then, the resultant data is sent through the data transmission means 1005, the network interface means 1004, the transmission line 1003, the network interface means 1009 of the moving picture reception apparatus 1002, and the data reception means 1012 to the error determination means 1013 for detecting an error during the transmission of the data. If an error does not occur, the error determination means 1013 sends the moving picture data to the decoding means 1014 and the redundant moving picture data is discarded. If an error occurs, the redundant data is sent to the decoding means 1014. The decoding means 1014 decodes the coded moving picture data into displayable form and sends the provided data to the display means 1015, which then displays a moving picture based on the data.

To use the system to add redundant data so as to send all frames doubly, the transmitted data amount is doubled; to add redundant data so as to send I pictures doubly, the transmitted data amount result in about a 1½-times amount because the I picture occupation percentage between one I picture and the next I picture is about a half.

To transmit a moving picture on a narrow-band transmission line in the error recovery method in moving picture transmission in the related art, the effective band is furthermore narrowed because of the redundant data and the moving picture quality and the frame rate are lowered; this is a problem.

SUMMARY OF THE INVENTION

It is therefore an object of the invention to enable error recovery using additional data with smaller redundancy in order to use a band of a transmission line efficiently in an error recovery method in moving picture transmission.

To the end, according to the invention, first, a moving picture data structure wherein a P' picture of a forward predictive coded image of a picture immediately preceding an I picture (intraframe coded image) and the I picture is placed preceding or following the I picture is provided.

Thus, if an error occurs in the I picture during the data transmission, the P' picture can be used to recover the I picture from the error.

Second, a moving picture data structure wherein a P" picture of a forward predictive coded image of an I picture immediately preceding the current I picture and the current I picture is placed preceding or following the current I picture is provided.

Thus, if an error occurs in the I picture or the picture immediately preceding the I picture during the data transmission, the immediately preceding I picture and the P" picture can be used to recover the I picture from the error.

Third, a moving picture transmission apparatus comprises differential data transmission means for transmitting data for error correction on a different band when moving picture data is transmitted to a transmission line.

Thus, differential data can be transmitted without hanging data transmission means.

Fourth, a moving picture transmission apparatus comprises time information addition means for adding the same time information as moving picture data to data for error correction when the moving picture data is transmitted to a transmission line.

Thus, the moving picture data reception apparatus receiving the moving picture data can separate the received data into the moving picture data and the data for error correction.

Fifth, a moving picture transmission apparatus comprises redundancy control data reception means for receiving redundancy control data from moving picture reception apparatus when the moving picture data is transmitted to a transmission line.

Thus, data for error correction can be optimized for transmission.

Sixth, a moving picture reception apparatus comprises differential data reception means for receiving data for error correction on a different band when moving picture data is received from a transmission line.

Thus, differential data can be received without changing data reception means.

DETAILED DESCRIPTION OF THE PREFERRED EMBODIMENTS

Referring now to the accompanying drawings (FIGS. 1 to 9), there are shown preferred embodiments of the invention. As many apparently widely different embodiments of the invention may be made without departing from the spirit and scope thereof, it is to be understood that the invention is not limited to specific embodiments thereof.

First Embodiment

Figure 1:
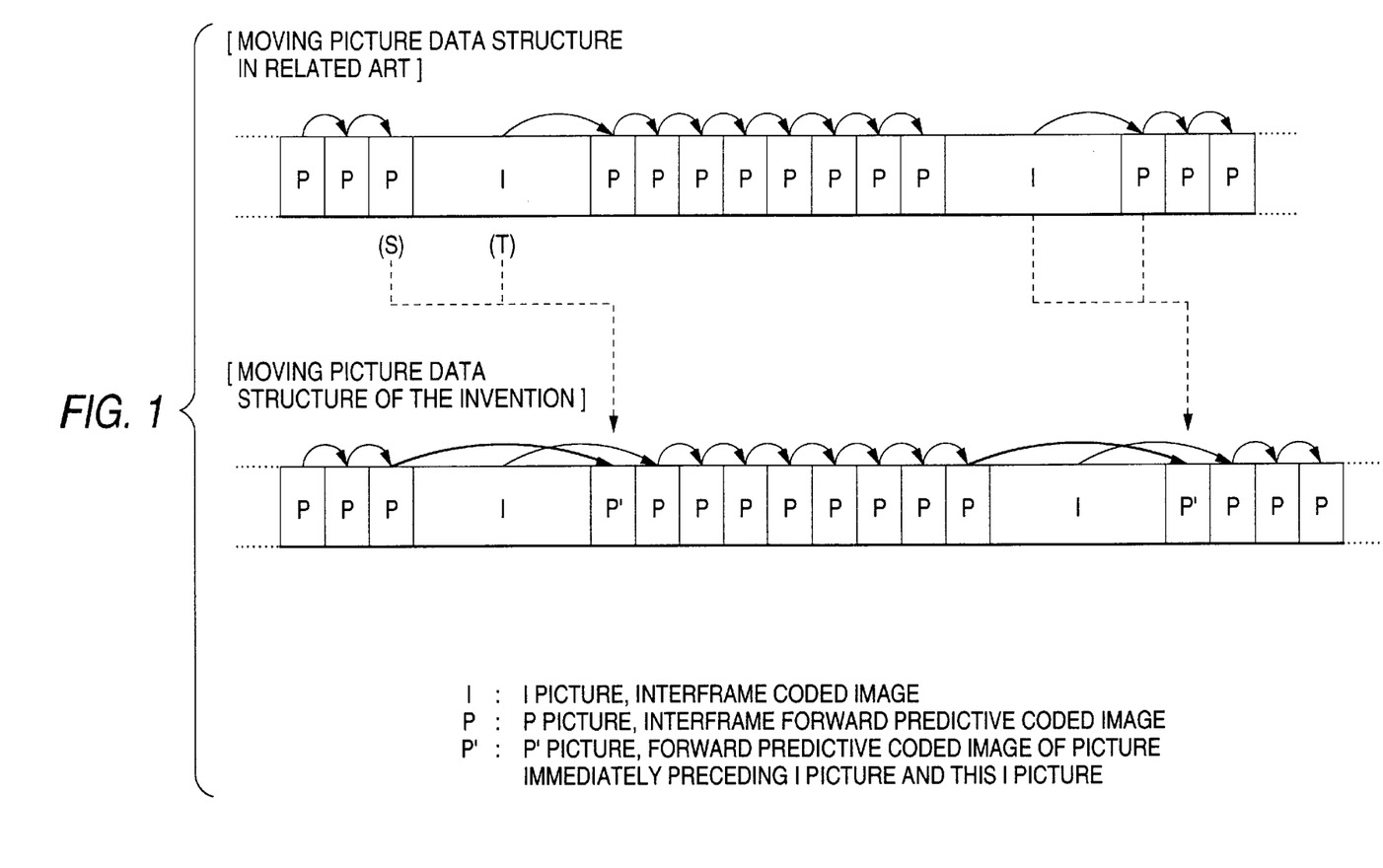
FIG. 1 is a drawing to show moving picture data structures in a first embodiment of the invention.

FIG. 1 shows a moving picture data structure. In the figure, I denotes an I picture (intraframe coded image), P denotes a P picture (interframe forward predictive coded image), and P' denotes a P' picture (forward predictive coded image of "a picture [S] immediately preceding one I picture [T]" and "the I picture [T]").

Figure 2:
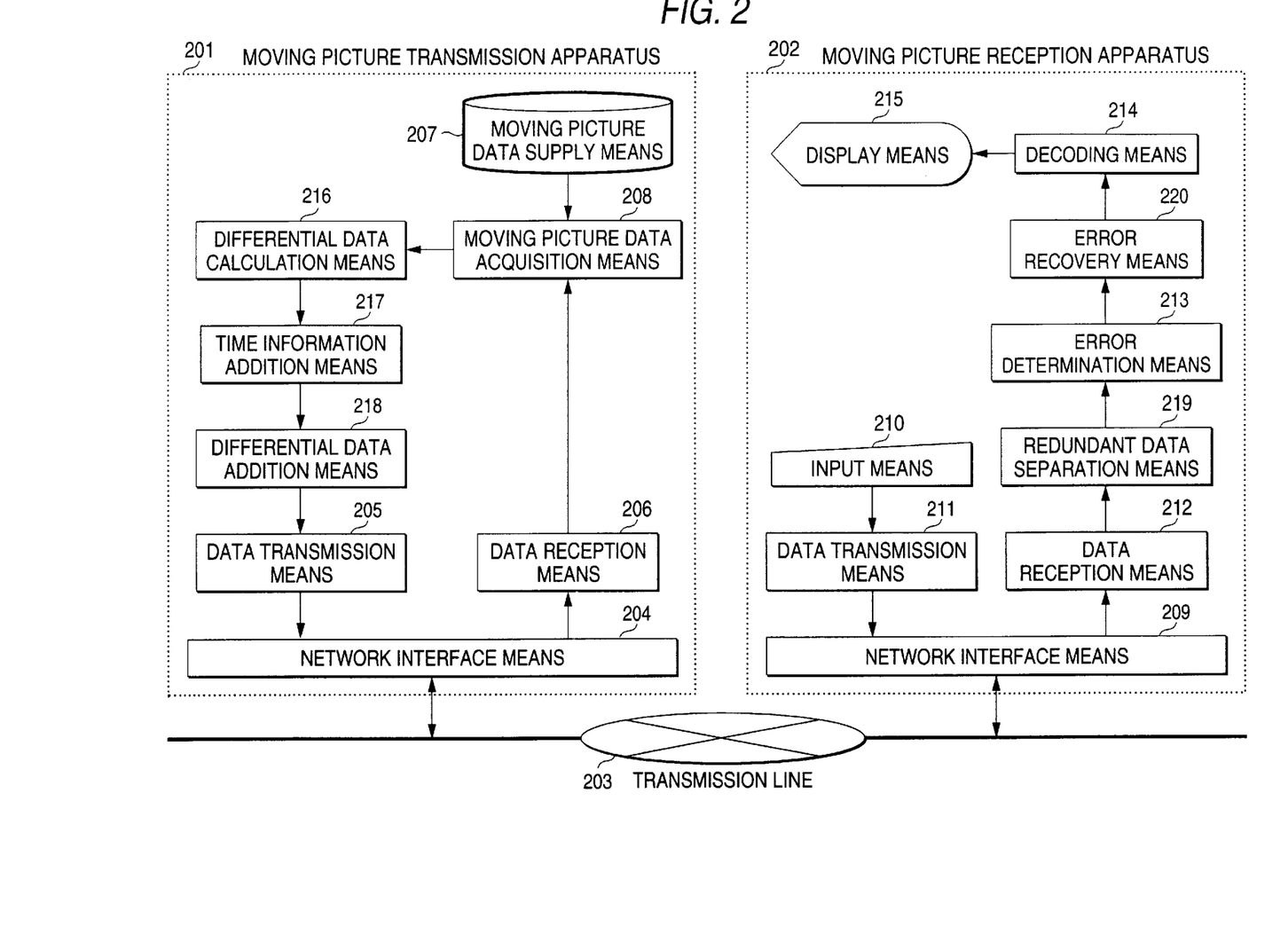
FIG. 2 is a block diagram to show the configuration of a moving picture transmission system in the first embodiment of the invention.

FIG. 2 is a block diagram to show the configuration of an error correction system. In the figure, numeral 201 denotes a moving picture transmission apparatus and numeral 202 denotes a moving picture reception apparatus; they are connected by a transmission line 203.

The moving picture transmission apparatus 201 has network interface means 204, data transmission means 205, data reception means 206, and moving picture data supply means 207 for supplying a moving picture. Moving image data acquisition means 208 acquires moving picture data based on command data obtained from the data reception means 206 from the moving picture data supply means 207. Differential data calculation means 216 calculates a P' picture of a forward predictive coded image of a picture immediately preceding an I picture and the I picture, time information addition means 217 adds time information, and differential data addition means 218 adds the P' picture following the I picture.

The moving picture reception apparatus 202 has network interface means 209, data transmission means 211, data reception means 212, input means 210 for entering a command, and display means 215 for displaying a moving picture. Redundant data separation means 219 uses time information to separate data obtained at the data reception means 212 into moving picture data and redundant data. Error determination means 213 checks whether or not an error occurs during the transmission of the data, error recovery means 220 executes error recovery, decoding means 214 decodes the data, and display means 215 displays the data.

The operation of the described data transmission system is as follows:

When the operator enters a moving picture command such as playback, stop, fast forward, rewind, or random access, the input means of the moving picture reception apparatus 202 sends the entered command to the data transmission means 211. The command sent to the data transmission means 211 is received by the data reception means 206 of the moving picture transmission apparatus 201 through the network interface means 209, the transmission line 203, and the network interface means 204. The command received by the data reception means 206 is sent to the moving picture data acquisition means 208, which then acquires the moving picture data corresponding to the command from the moving picture data supply means 207.

The moving picture data acquired by the moving picture data acquisition means 208 is sent to the differential data calculation means 216, which then calculates and prepares a P' picture of a forward predictive coded image of a picture immediately preceding an I picture and the I picture. The time information addition means 217 adds the same time information as the I picture to the prepared P' picture. The differential data addition means 218 inserts the P' picture following the I picture. The data transmission means 205 adds network information to the moving picture data and transmits the resultant data to the transmission line 203 through the network interface 204.

The moving picture data in which the P' picture is inserted is received by the data reception means 212 through the transmission line 203 and the network interface 209. The redundant data separation means 219 separates the received moving picture data into moving picture data and redundant data (P' picture) and sends them to the error determination means 213. The error determination means 213 checks whether or not an error occurs based on the time information added by the time information addition means 217 and the network information added by the data transmission means 205, then sends the moving picture data to the error recovery means 220. If an error occurs at the I picture read time, the error recovery means 220 uses the P' picture sent following the I picture in place of the error occurring I picture and sends the data to the decoding means 214. If an error occurs at the frame read time other than the I picture, the error recovery means 220 discards the data until another I picture is sent. If an error does not occur, the error recovery means 220 discards the P' picture. The decoding means 214 decodes the moving picture data into a format in which the display means 215 can display the moving picture data, then the display means 215 displays a moving picture.

In the related art, to add redundant data so as to send all frames doubly, the transmitted data amount is doubled; to add redundant data so as to send I pictures doubly, the transmitted data amount result in about a 1.5-times amount because the I picture occupation percentage between one I picture and the next I picture is about a half.

In the embodiment, however, when an error occurs in an I picture during the data transmission, the P' picture (forward predictive coded image of the picture immediately preceding the I picture and the I picture) sent following the I picture is used, so that the P' picture occupation percentage between the I picture and the next I picture becomes about a seventh (at the time of two frames per second); moving picture error recovery can be executed with a less data amount and the practical effect is large.

Second Embodiment

Figure 3:
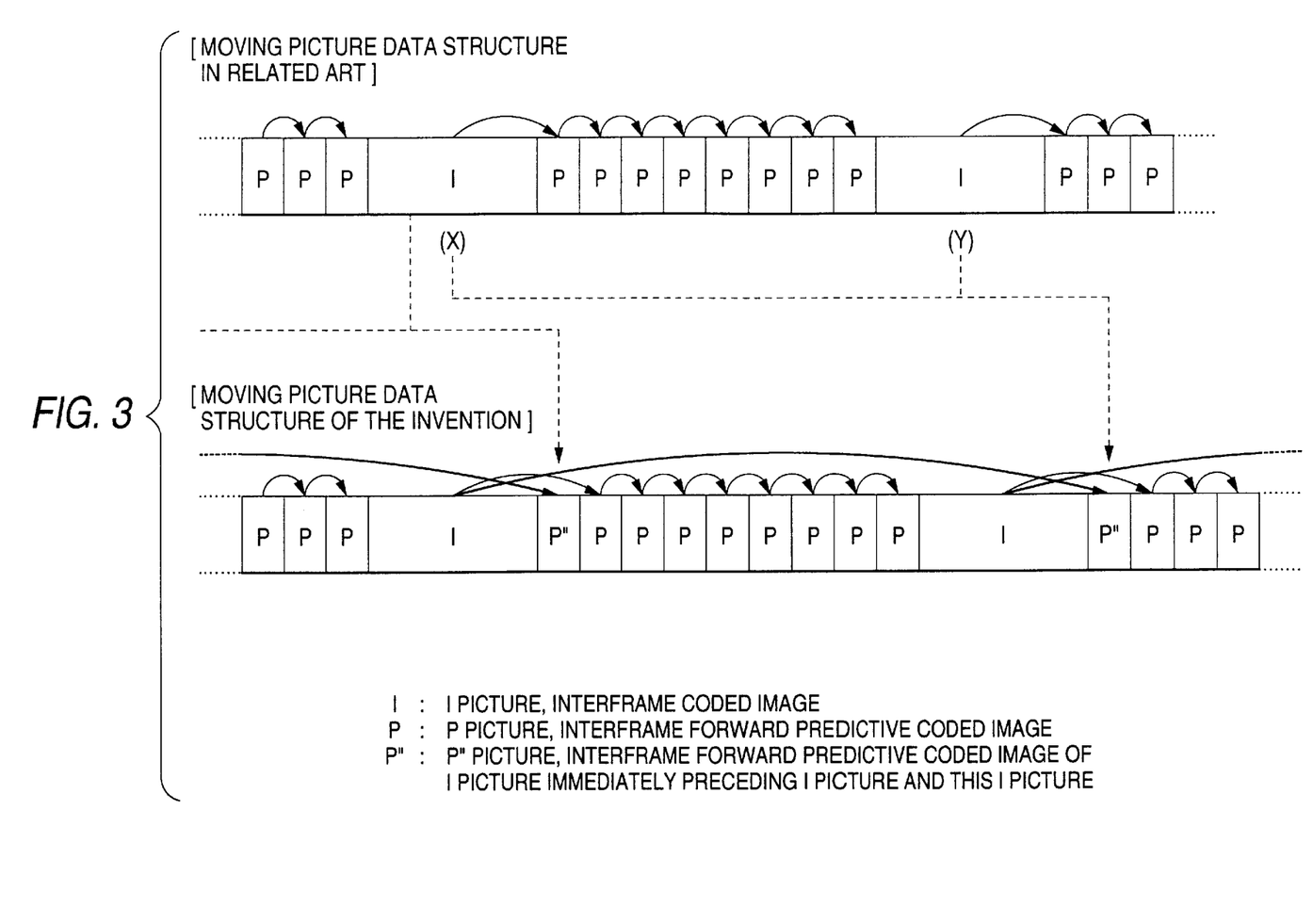
FIG. 3 is a drawing to show moving picture data structures in a second embodiment of the invention.

FIG. 3 shows a moving picture data structure. In the figure, I denotes an I picture (intraframe coded image), P denotes a P picture (interframe forward predictive coded image), and P" denotes a P" picture (forward predictive coded image of "an I picture [X] immediately preceding one I picture [Y]" and "the current I picture [Y]").

Figure 4:
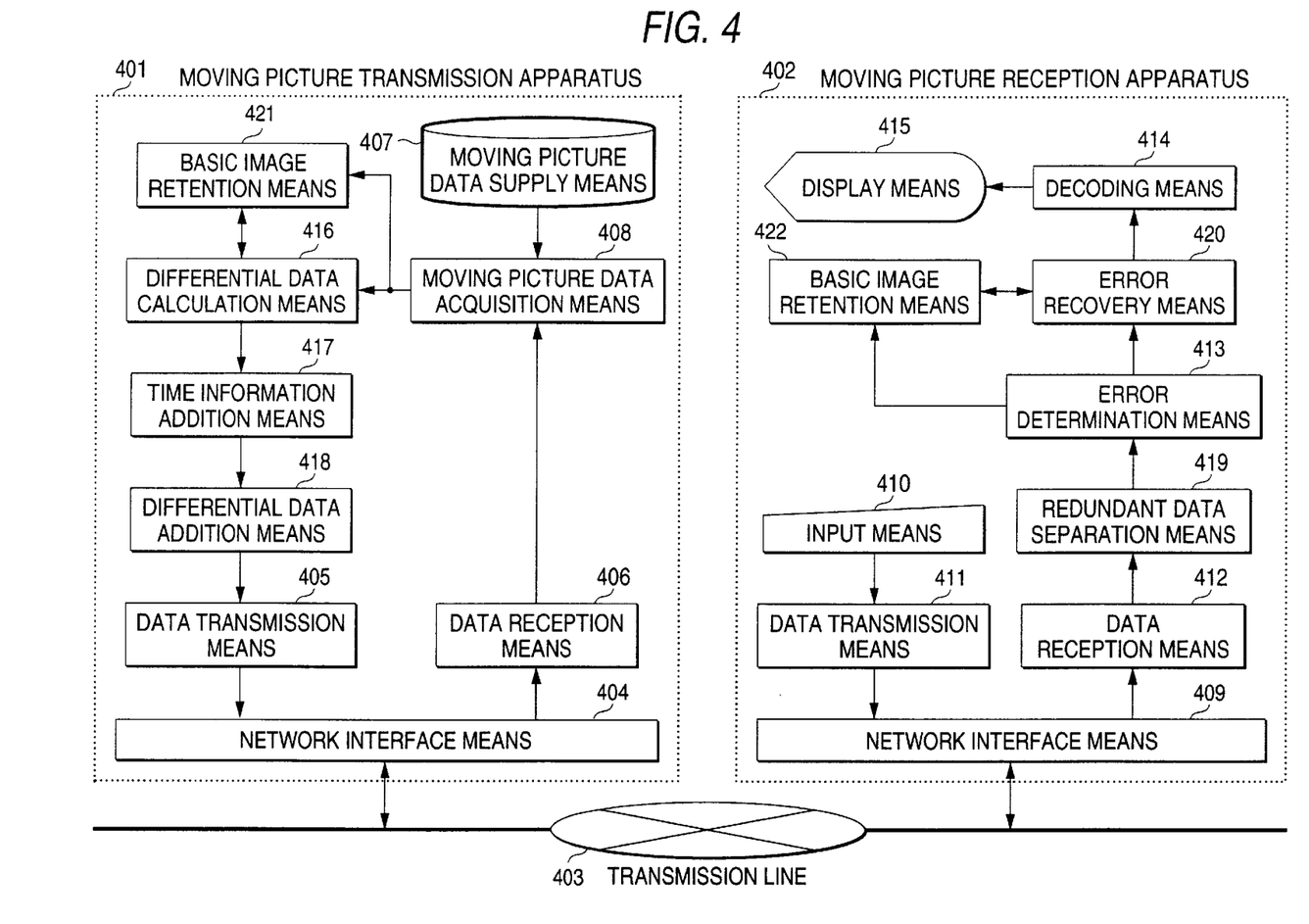
FIG. 4 is a block diagram to show the configuration of a moving picture transmission system in the second embodiment of the invention.

FIG. 4 is a block diagram to show the configuration of an error correction system. In the figure, numeral 401 denotes a moving picture transmission apparatus and numeral 402 denotes a moving picture reception apparatus; they are connected by a transmission line 403.

The moving picture transmission apparatus 401 has network interface means 404, data transmission means 405, data reception means 406, and moving picture data supply means 407 for supplying a moving picture. Moving image data acquisition means 408 acquires moving picture data based on command data obtained from the data reception means 406 from the moving picture data supply means 407 and temporarily retains I pictures in basic image retention means 421. Differential data calculation means 416 calculates a P" picture of a forward predictive coded image of the I picture immediately preceding one I picture and this I picture, time information addition means 417 adds time information, and differential data addition means 418 adds the P' picture following the I picture.

The moving picture reception apparatus 402 has network interface means 409, data transmission means 407, data reception means 412, input means 410 for entering a command, and display means 415 for displaying a moving picture. Redundant data separation means 419 uses time information to separate data obtained at the data reception means 412 into moving picture data and redundant data. Error determination means 413 checks whether or not an error occurs during the transmission of the data, and temporarily retains I pictures in basic image retention means 422. Error recovery means 420 executes error recovery, decoding means 414 decodes the data, and display means 415 displays the data.

The operation of the described data transmission system is as follows:

When the operator enters a moving picture command such as playback, stop, fast forward, rewind, or random access, the input means of the moving picture reception apparatus 402 sends the entered command to the data transmission means 411. The command sent to the data transmission means 411 is received by the data reception means 406 of the moving picture transmission apparatus 401 through the network interface means 409, the transmission line 403, and the network interface means 404. The command received by the data reception means 406 is sent to the moving picture data acquisition means 408, which then acquires the moving picture data corresponding to the command from the moving picture data supply means 407.

The I pictures of the moving picture data acquired by the moving picture data acquisition means 408 are temporarily retained in the basic image retention means 421 and others are sent to the differential data calculation means 416, which then calculates and prepares a P" picture of a forward predictive coded image of the I picture immediately preceding one I picture and this I picture. The time information addition means 417 adds the same time information as the I picture to the prepared P" picture. The differential data addition means 418 inserts the P" picture following the I picture. The data transmission means 405 adds network information to the moving picture data and transmits the resultant data to the transmission line 403 through the network interface 404.

The moving picture data in which the P" picture is inserted is received by the data reception means 412 through the transmission line 403 and the network interface 409. The redundant data separation means 419 separates the received moving picture data into moving picture data and redundant data (P" picture) and sends them to the error determination means 413. The error determination means 413 checks whether or not an error occurs based on the time information added by the time information addition means 417 and the network information added by the data transmission means 405, then sends the I pictures to the basic image retention means 422 and others to the error recovery means 420. If an error occurs at the I picture read time, the error recovery means 420 uses the P" picture and the retained I picture corresponding to the error occurring I picture and sends them to the decoding means 414 in place of the error occurring I picture. If an error occurs at the frame read time other than the I picture, the error recovery means 420 discards the data until another I picture is sent. If an error does not occur, the error recovery means 420 discards the P" picture. The decoding means 414 decodes the moving picture data into a format in which the display means 415 can display the moving picture data, then the display means 415 displays a moving picture.

Thus, in the embodiment, if an error occurs in an I picture or its immediately preceding picture during the data transmission, the P" picture (forward predictive coded image of the I picture immediately preceding one I picture and this I picture), whereby moving picture error recovery without waste as in the related art can be executed as in the first embodiment, and the practical effect is large.

Comparing the P' picture in the first embodiment with the P" picture in the second embodiment, to use the P' picture, an error correction can be made without providing the basic image retention means and the effect is exerted at smaller costs; on the other hand, to use the P" picture, the basic image retention means is provided, whereby if an error occurs in the frame immediately preceding an I picture, the effect is exerted.

Third Embodiment

Figure 5:
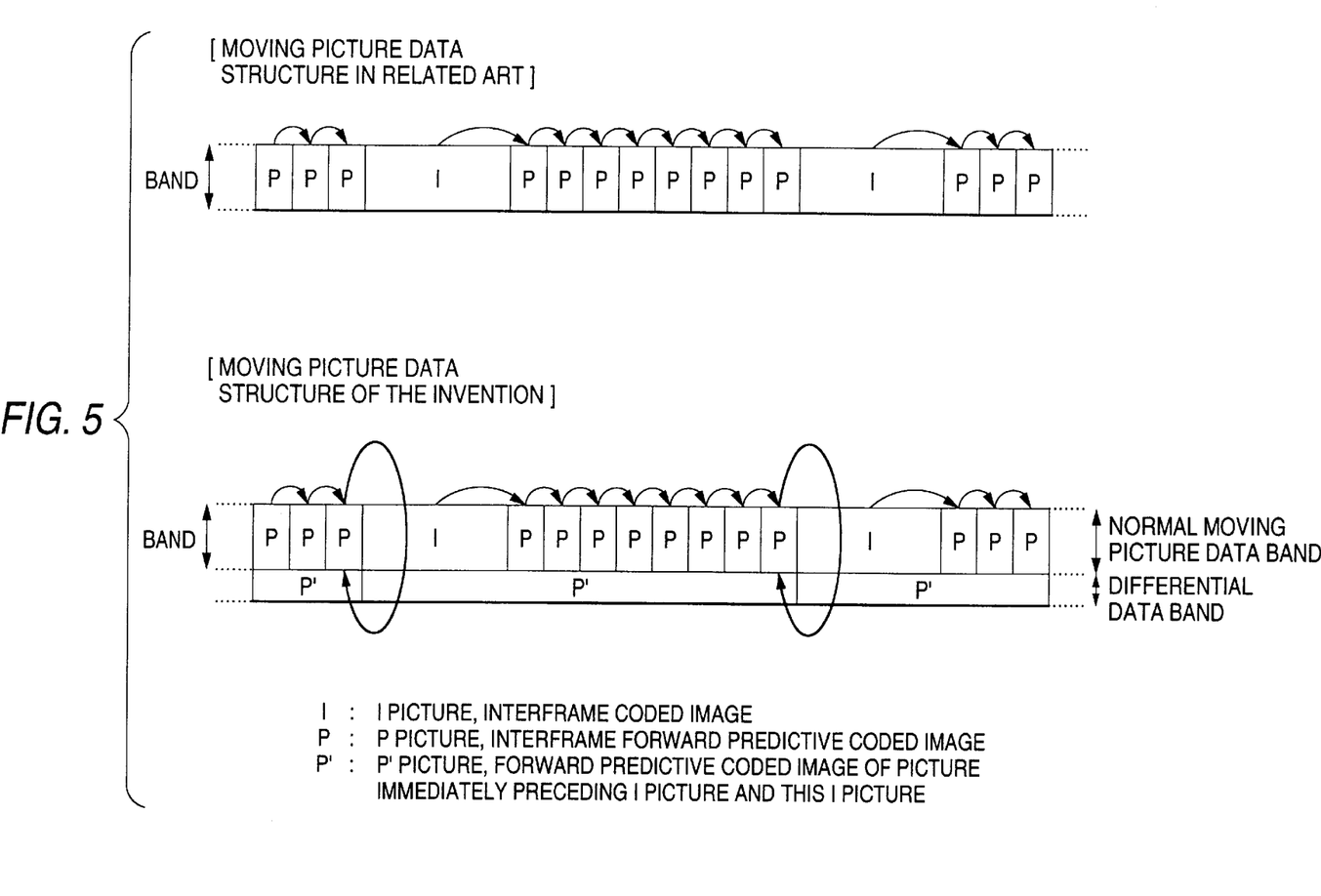
FIG. 5 is a drawing to show moving picture data structures in a third embodiment of the invention.

FIG. 5 shows a moving picture data structure. In the figure, I denotes an I picture (intraframe coded image), P denotes a P picture (interframe forward predictive coded image), and P' denotes a P' picture (forward predictive coded image of "a picture [S] immediately preceding one I picture [T]" and "the I picture [T]"). The P' picture uses a different band from that of the normal moving picture data.

Figure 6:
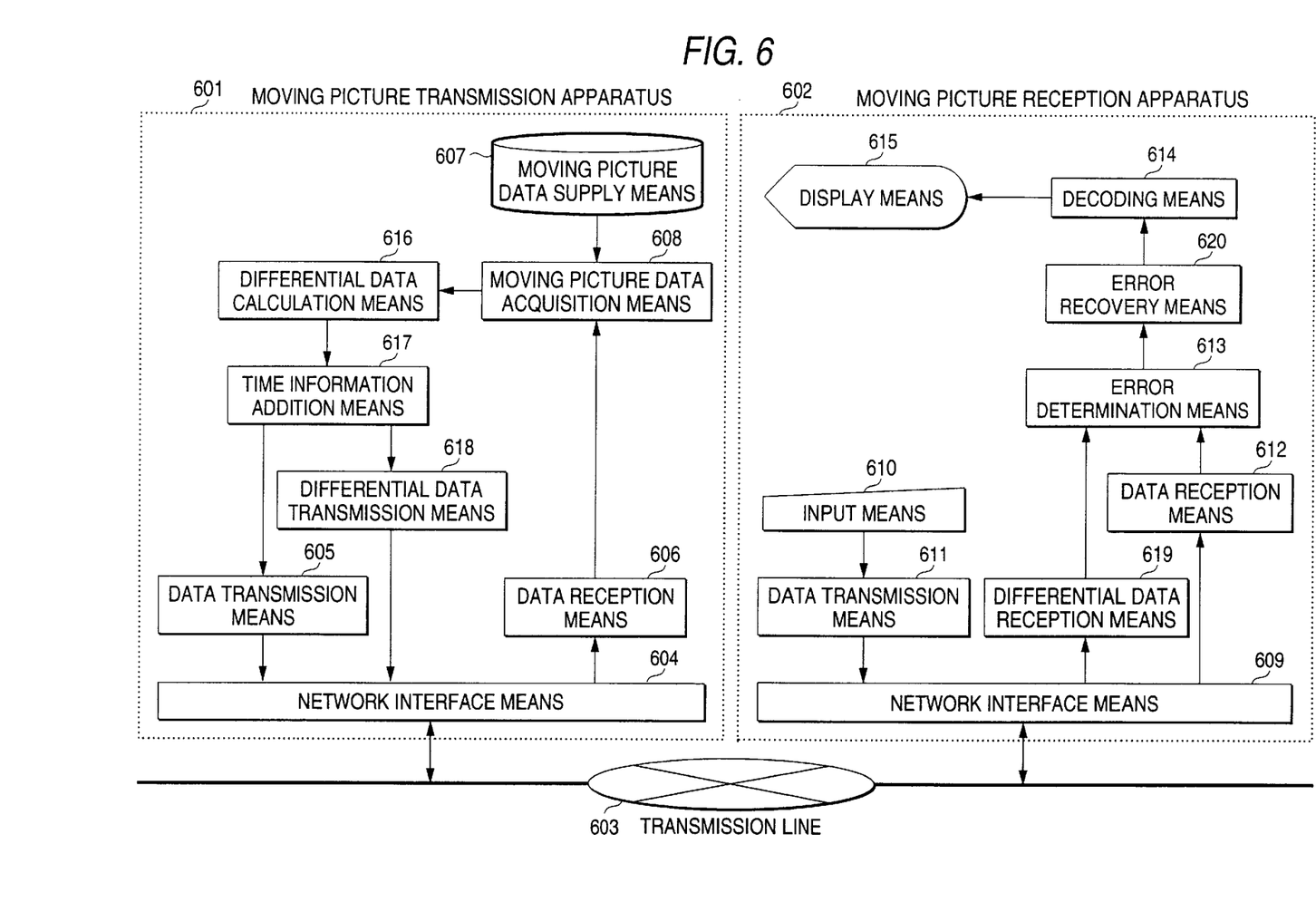
FIG. 6 is a block diagram to show the configuration of a moving picture transmission system in the third embodiment of the invention.

FIG. 6 is a block diagram to show the configuration of an error correction system. In the figure, numeral 601 denotes a moving picture transmission apparatus and numeral 602 denotes a moving picture reception apparatus; they are connected by a transmission line 603.

The moving picture transmission apparatus 601 has network interface means 604, data transmission means 605, data reception means 606, and moving picture data supply means 607 for supplying a moving picture. Moving image data acquisition means 608 acquires moving picture data based on command data obtained from the data reception means 606 from the moving picture data supply means 607. Differential data calculation means 616 calculates a P' picture of a forward predictive coded image of a picture immediately preceding an I picture and the I picture, time information addition means 617 adds time information, and differential data transmission means 618 transmits the P' picture to the transmission line 603 through the network interface means 604.

The moving picture reception apparatus 602 has network interface means 609, data transmission means 611, data reception means 612, input means 610 for entering a command, and display means 615 for displaying a moving picture. Error determination means 613 checks data obtained at the data reception means 612 and differential data reception means 619 for an error occurring during the transmission of the data, error recovery means 620 executes error recovery, decoding means 614 decodes the data, and display means 615 displays the data.

The operation of the described data transmission system is as follows:

When the operator enters a moving picture command such as play back, stop, fast forward, rewind, or random access, the input means of the moving picture reception apparatus 602 sends the entered command to the data transmission means 611. The command sent to the data transmission means 611 is received by the data reception means 606 of the moving picture transmission apparatus 601 through the network interface means 609, the transmission line 603, and the network interface means 604. The command received by the data reception means 606 is sent to the moving picture data acquisition means 608, which then acquires the moving picture data corresponding to the command from the moving picture data supply means 607.

The moving picture data acquired by the moving picture data acquisition means 608 is sent to the differential data calculation means 616, which then calculates and prepares a P' picture of a forward predictive coded image of a picture immediately preceding an I picture and the I picture. The time information addition means 617 adds the same time information as the I picture to the prepared P' picture. The differential data transmission means 618 sends the P' picture to the transmission line 603 through the network interface means 604 and the data transmission means 605 sends others to the transmission line 603 through the network interface 604.

The P' picture and the moving picture data are received by the differential data reception means 619 and the data reception means 612 through the transmission line 603 and the network interface means 609, then are sent to the error determination means 613. The error determination means 613 checks whether or not an error occurs based on the time information added by the time information addition means 617 and the network information added by the data transmission means 605, then sends the moving picture data to the error recovery means 620. If an error occurs at the I picture read time, the error recovery means 620 uses the P' picture in place of the error occurring I picture and sends the data to the decoding means 614. If an error occurs at the frame read time other than the I picture, the error recovery means 620 discards the data until another I picture is sent. If an error does not occur, the error recovery means 620 discards the P' picture. The decoding means 614 decodes the moving picture data into a format in which the display means 615 can display the moving picture data, then the display means 615 displays a moving picture.

Thus, in the embodiment, with the moving picture data transmission means and reception means intact as in the related art, when an error occurs in an I picture during the data transmission, the P' picture of a forward predictive coded image of the picture immediately preceding the I picture and the I picture sent from another band can be used to execute moving picture error recovery, and the practical effect is large.

Comparing insertion of the P' picture in moving picture data in the first embodiment with transmission of the P' picture on another band in the third embodiment, in the insertion method of the P' picture in moving picture data, the redundant data addition means and the redundant data separation means make error corrections, so that the effect is exerted without providing new transmission means or new reception means; on the other hand, in the transmission method of the P' picture on another band, the transmission apparatus and the reception apparatus for the P' picture are provided in place of the redundant data separation means, whereby the effect is exerted with the transmission means and the reception means intact as in the related art.

Fourth Embodiment

Figure 7:
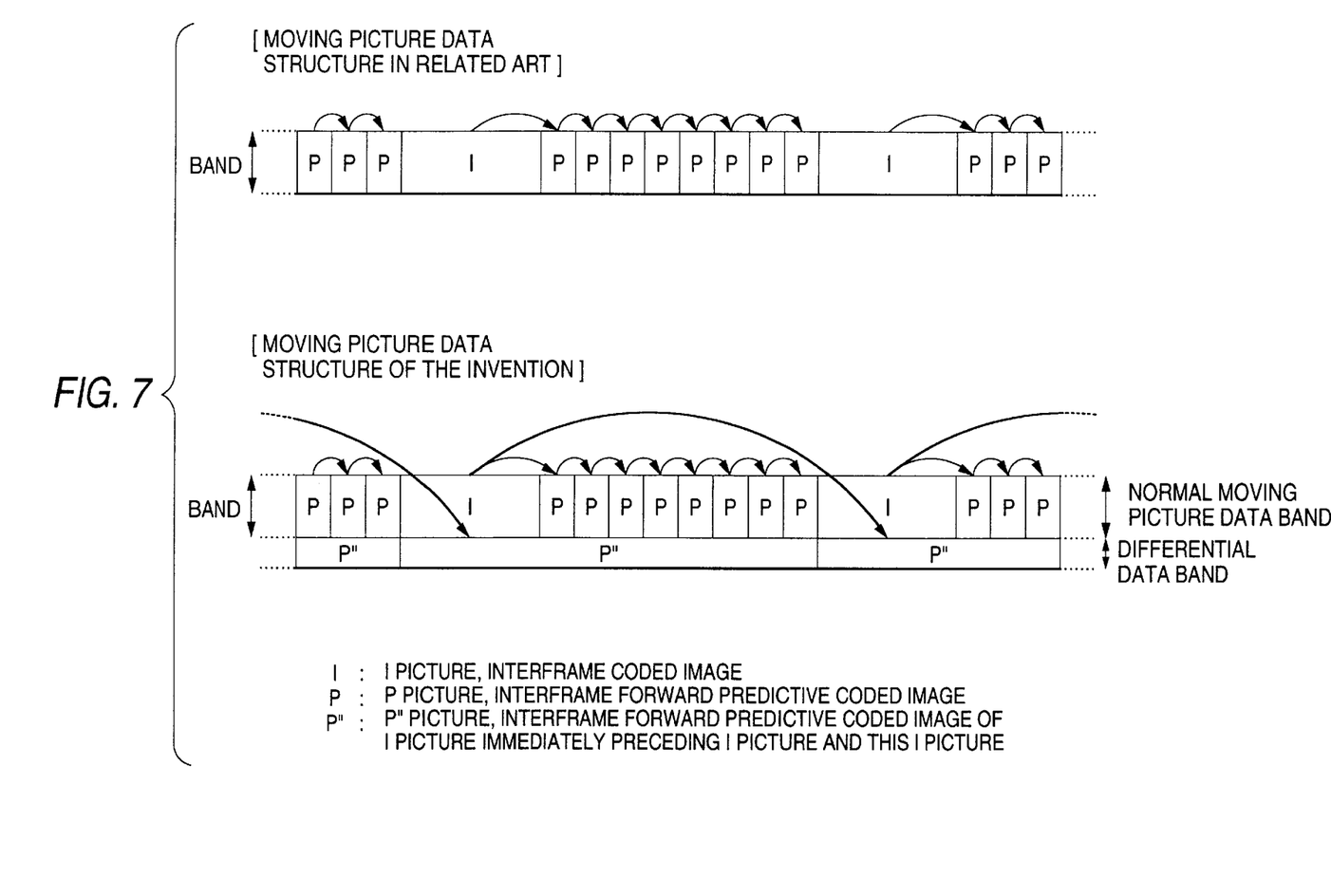
FIG. 7 is a drawing to show moving picture data structures in a fourth embodiment of the invention.

FIG. 7 shows a moving picture data structure. In the figure, I denotes an I picture (intraframe coded image), P denotes a P picture (interframe forward predictive coded image), and P" denotes a P" picture (forward predictive coded image of "an I picture [X] immediately preceding one I picture [Y]" and "the current I picture [Y]"). The P" picture uses a different band from that of the moving picture data in the related art.

Figure 8:
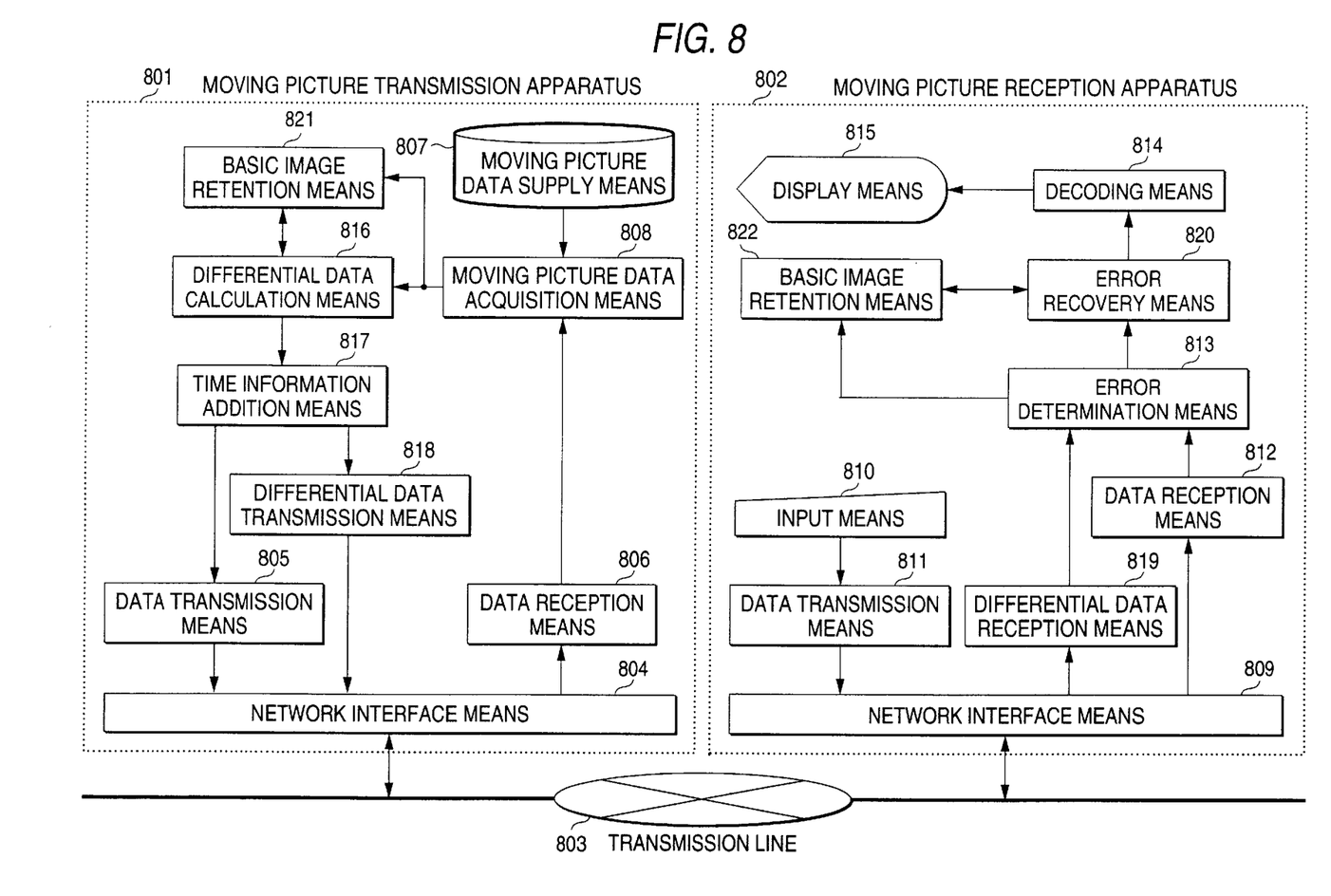
FIG. 8 is a block diagram to show the configuration of a moving picture transmission system in the fourth embodiment of the invention.

FIG. 8 is a block diagram to show the configuration of an error correction system. In the figure, numeral 801 denotes a moving picture transmission apparatus and numeral 802 denotes a moving picture reception apparatus; they are connected by a transmission line 803.

The moving picture transmission apparatus 801 has network interface means 804, data transmission means 805, data reception means 806, and moving picture data supply means 807 for supplying a moving picture. Moving image data acquisition means 808 acquires moving picture data based on command data obtained from the data reception means 806 from the moving picture data supply means 807 and temporarily retains I pictures in basic image retention means 821. Differential data calculation means 816 calculates a P" picture of a forward predictive coded image of the I picture immediately preceding one I picture and this I picture, time information addition means 817 adds time information, and differential data transmission means 818 transmits the P' picture to the transmission line 803 through the network interface means 804.

The moving picture reception apparatus 802 has network interface means 809, data transmission means 811, data reception means 812, input means 810 for entering a command, and display means 815 for displaying a moving picture. Error determination means 813 checks data obtained at the data reception means 812 and differential data reception means 819 for an error occurring during the transmission of the data, and temporarily retains I pictures in basic image retention means 822. Error recovery means 820 executes error recovery, decoding means 814 decodes the data, and display means 815 displays the data.

The operation of the described data transmission system is as follows:

When the operator enters a moving picture command such as play back, stop, fast forward, rewind, or random access, the input means of the moving picture reception apparatus 802 sends the entered command to the data transmission means 811. The command sent to the data transmission means 811 is received by the data reception means 806 of the moving picture transmission apparatus 801 through the network interface means 809, the transmission line 803, and the network interface means 804. The command received by the data reception means 806 is sent to the moving picture data acquisition means 808, which then acquires the moving picture data corresponding to the command from the moving picture data supply means 807.

The I pictures of the moving picture data acquired by the moving picture data acquisition means 808 are temporarily retained in the basic image retention means 821 and others are sent to the differential data calculation means 816, which then calculates and prepares a P" picture of a forward predictive coded image of the I picture immediately preceding one I picture and this I picture. The time information addition means 817 adds the same time information as the I picture to the prepared P" picture. The differential data transmission means 818 sends the P" picture to the transmission line 803 through the network interface means 804 and the data transmission means 805 sends others to the transmission line 803 through the network interface 804.

The P" picture and the moving picture data are received by the differential data reception means 819 and the data reception means 812 through the transmission line 803 and the network interface 809, then are sent to the error determination means 813. The error determination means 813 checks whether or not an error occurs based on the time information added by the time information addition means 817 and the network information added by the data transmission means 805, then sends the I pictures to the basic image retention means 822 and others to the error recovery means 820. If an error occurs at the I picture read time, the error recovery means 820 uses the P" picture and the retained I picture corresponding to the error occurring I picture and sends them to the decoding means 814 in place of the error occurring I picture. If an error occurs at the frame read time other than the I picture, the error recovery means 820 discards the data until another I picture is sent. If an error does not occur, the error recovery means 820 discards the P" picture. The decoding means 814 decodes the moving picture data into a format in which the display means 815 can display the moving picture data, then the display means 815 displays a moving picture.

Thus, in the embodiment, with the moving picture data transmission means and reception means intact as in the related art, when an error occurs in an I picture during the data transmission, the P" picture of a forward predictive coded image of I the picture immediately preceding the I picture and the I picture sent from another band can be used to execute moving picture error recovery, and the practical effect is large.

Comparing insertion of the P" picture in moving picture data in the second embodiment with transmission of the P" picture on another band in the fourth embodiment, in the insertion method of the P" picture in moving picture data, the redundant data addition means and the redundant data separation means make error corrections, so that the effect is exerted without providing new transmission means or new reception means; on the other hand, in the transmission method of the P" picture on another band, the transmission apparatus and the reception apparatus for the P" picture are provided in place of the redundant data separation means, whereby the effect is exerted with the transmission means and the reception means intact as in the related art.

Fifth Embodiment

Figure 9:
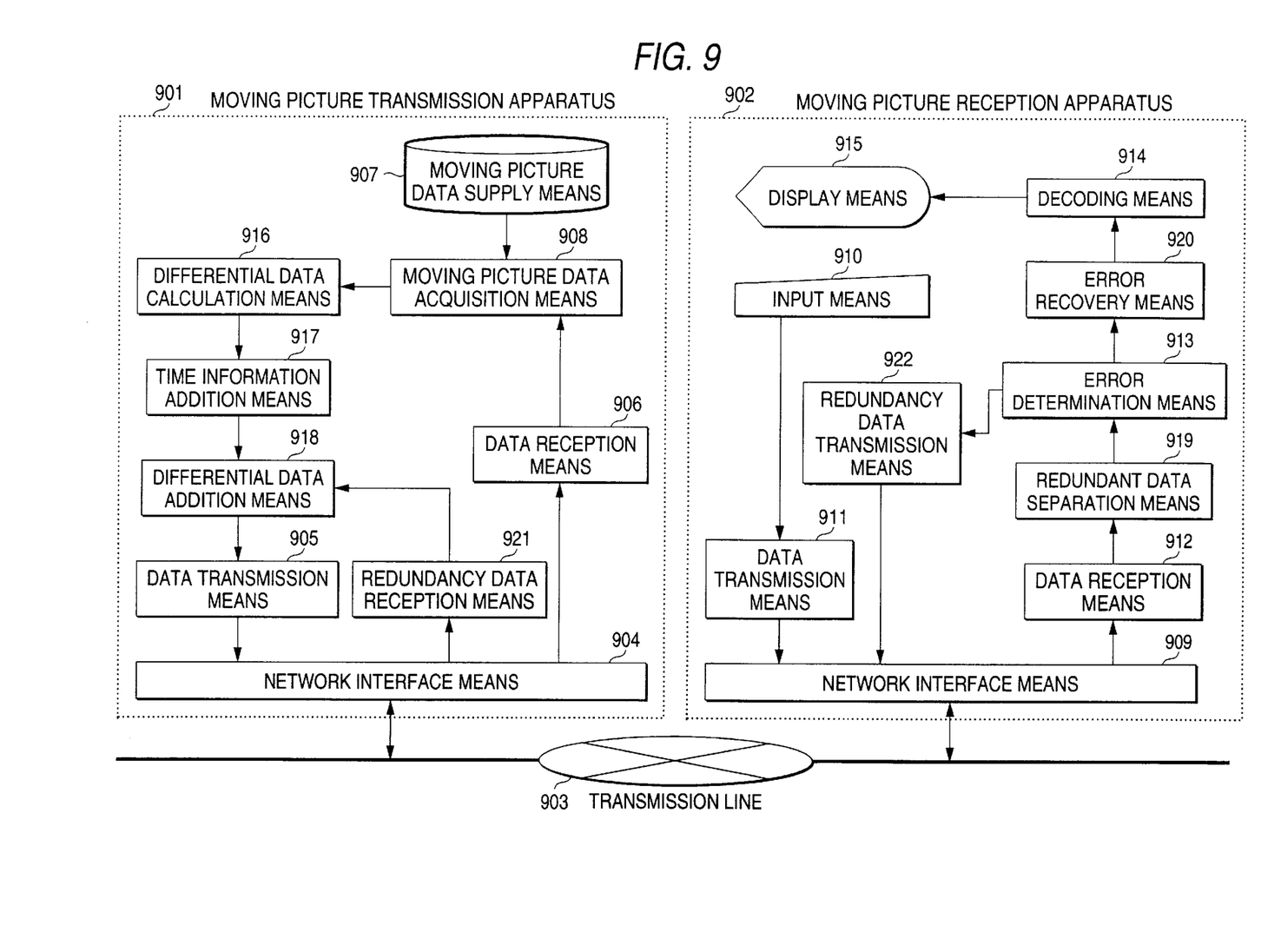
FIG. 9 is a block diagram to show the configuration of a moving picture transmission system in a fifth embodiment of the invention.

FIG. 9 is a block diagram to show the configuration of an error correction system. In the figure, numeral 901 denotes a moving picture transmission apparatus and numeral 902 denotes a moving picture reception apparatus; they are connected by a transmission line 903.

The moving picture transmission apparatus 901 has network interface means 904, data transmission means 905, data reception means 906, and moving picture data supply means 907 for supplying a moving picture. Moving image data acquisition means 908 acquires moving picture data based on command data obtained from the data reception means 906 from the moving picture data supply means 907. Differential data calculation means 916 calculates a P' picture of a forward predictive coded image of a picture immediately preceding an I picture and the I picture, time information addition means 917 adds time information, and differential data addition means 918 determines the frequency added following the I picture based on redundancy data provided by redundancy data reception means 921.

The moving picture reception apparatus 902 has network interface means 909, data transmission means 911, data reception means 912, input means 910 for entering a command, and display means 915 for displaying a moving picture. Redundant data separation means 919 uses time information to separate data obtained at the data reception means 912 into moving picture data and redundant data. Error determination means 913 checks whether or not an error occurs during the transmission of the data, redundancy data transmission means 922 sends the error frequency to the moving picture transmission apparatus 901, error recovery means 920 executes error recovery, decoding means 914 decodes the data, and display means 915 displays the data.

The operation of the described data transmission system is as follows:

When the operator enters a moving picture command such as play back, stop, fast forward, rewind, or random access, the input means of the moving picture reception apparatus 902 sends the entered command to the data transmission means 911. The command sent to the data transmission means 911 is received by the data reception means 906 of the moving picture transmission apparatus 901 through the network interface means 909, the transmission line 903, and the network interface means 904. The command received by the data reception means 906 is sent to the moving picture data acquisition means 908, which then acquires the moving picture data corresponding to the command from the moving picture data supply means 907.

The moving picture data acquired by the moving picture data acquisition means 908 is sent to the differential data calculation means 916, which then calculates and prepares a P' picture of a forward predictive coded image of a picture immediately preceding an I picture and the I picture. The time information addition means 917 adds the same time information as the I picture to the prepared P' picture. The differential data addition means 918 obtains the error occurrence frequency information in the moving picture reception apparatus 902 provided by the redundancy data reception means 921. If an error little occurs, the differential data addition means 918 stops inserting the P' picture; if an error occurs frequently, the differential data addition means 918 inserts the P' picture following the I picture. The data transmission means 905 adds network information to the moving picture data and transmits the resultant data to the transmission line 903 through the network interface 904.

The moving picture data in which the P' picture is inserted is received by the data reception means 912 through the transmission line 903 and the network interface 909. The redundant data separation means 919 separates the received moving picture data into moving picture data and redundant data (P'picture) and sends them to the error determination means 913. The error determination means 913 checks whether or not an error occurs based on the time information added by the time information addition means 917 and the network information added by the data transmission means 905, then sends the moving picture data to the error recovery means 920 and sends the error occurrence frequency to the redundancy data transmission means 922, which then sends the error occurrence frequency to the moving picture transmission apparatus 901. If an error occurs at the I picture read time, the error recovery means 920 uses the P' picture sent following the I picture in place of the error occurring I picture and sends the data to the decoding means 914. If an error occurs at the frame read time other than the I picture, the error recovery means 920 discards the data until another I picture is sent. If an error does not occur, the error recovery means 920 discards the P' picture. The decoding means 914 decodes the moving picture data into a format in which the display means 915 can display the moving picture data, then the display means 915 displays a moving picture.

Thus, in the embodiment, when an error occurs in an I picture during the data transmission, the P' picture of a forward predictive coded image of the picture immediately preceding the I picture and the I picture sent following the I picture is used and the redundancy data is transmitted, whereby optimum moving picture error recovery can be executed and the practical effect is large.

The embodiment can be incorporated not only in the P' picture insertion method, but also in the P" picture insertion method (second embodiment) and the transfer methods of P' and P" redundant data on different bands (third and fourth embodiments).

In the invention, the examples wherein the P' and P" pictures are inserted immediately following the I picture have been described, but the P' or P" picture may be inserted immediately preceding the I picture. If a picture loss occurs, for example, in n successive frames, it is also possible to insert the P' or P" picture into the (n+1)st frame preceding or following the I picture rather than immediately preceding or following the I picture.

In the above description, it is explained transmission and reception of the moving picture data which has a data structure according to the present invention between the moving picture transmission apparatus and the moving picture reception apparatus according to the present invention. However, the present invention is not limited thereto. Transmission and reception of the moving picture can be performed between the standard moving picture transmission apparatus and the moving picture reception apparatus of the present invention, or between the moving picture transmission apparatus of the present invention and the standard moving picture reception apparatus.

In a case of that the moving picture transmission apparatus of the present invention transmits the moving picture to the standard moving picture reception apparatus and the standard moving picture reception apparatus playbacks the moving picture, one frame for redundancy/deferential data is increased. However, human eye can not recognize reproduction of this one frame. Thus, picture quality is not influenced.

Additionally, if an identifier (e.g. time stamp) is added to each frame in order to prevent the redundant reproduction, only one of subsequent P' or P" frame (vicinity before or after the I frame, which is send by the same band with I frame) is reproduced subsequent to I frame (intraframe).

On the other hand, in a case of that the standard moving picture transmission apparatus transmits moving picture and the moving picture reception apparatus of the present invention receives the moving picture, the reception apparatus of the present invention which eliminates redundancy data is naturally able to determine the redundant data is absent. Therefore, usual moving picture data (e.g. MPEG data) is also able to reproduce.

The advantages of the invention are as follows:

First, a moving picture data structure wherein a P' picture of a forward predictive coded image of a picture immediately preceding an I picture (intraframe coded image) and the I picture is placed preceding or following the I picture is provided, so that if an error occurs in the I picture during the data transmission, the P' picture can be used to recover the I picture from the error.

Second, a moving picture data structure wherein a P" picture of a forward predictive coded image of an I picture immediately preceding the current I picture and the current I picture is placed preceding or following the current I picture is provided, so that if an error occurs in the I picture or the picture immediately preceding the I picture during the data transmission, the immediately preceding I picture and the P" picture can be used to recover the I picture from the error.

Third, the moving picture transmission apparatus comprises the differential data transmission means for transmitting data for error correction on a different band when moving picture data is transmitted to the transmission line, whereby differential data can be transmitted without changing the data transmission means.

Fourth, the moving picture transmission apparatus comprises the time information addition means for adding the same time information as moving picture data to data for error correction when the moving picture data is transmitted to the transmission line whereby the moving picture data reception apparatus receiving the moving picture data can separate the received data into the moving picture data and the data for error correction.

Fifth, the moving picture transmission apparatus comprises the redundancy control data reception means for receiving redundancy control data from the moving picture reception apparatus when the moving picture data is transmitted to the transmission line, whereby data for error correction can be optimized for transmission.

Sixth, the moving picture reception apparatus comprises the differential data reception means for receiving data for error correction on a different band when moving picture data is received from the transmission line, whereby differential data can be received without changing the data reception means.

What is claimed is:

1. A moving picture transmission apparatus comprising:

moving picture data supply means;

moving picture data acquisition means for acquiring objective moving picture data from said moving picture data supply means; and data transmission means for transmitting the moving picture data acquired by said moving picture data acquisition means to a transmission line; and differential data calculation means being placed between said moving picture data supply means and said data transmission means for calculating a P' picture of a forward predictive coded image of a picture immediately preceding an I picture and the I picture.

2. A moving picture transmission apparatus comprising:

moving picture data supply means;

moving picture data acquisition means for acquiring objective moving picture data from said moving picture data supply means;

data transmission means for transmitting the moving picture data acquired by said moving picture data acquisition means to a transmission line;

basic image retention means being placed between said moving picture data supply means and said data transmission means for retaining I pictures; and differential data calculation means being placed between said moving picture data supply means and said data transmission means for calculating a P'" picture of a forward predictive coded image of an I picture immediately preceding the current I picture and the current I picture.

3. A moving picture transmission apparatus comprising:

moving picture data supply means;

moving picture data acquisition means for acquiring objective moving picture data from said moving picture data supply means;

data transmission means for transmitting the moving picture data acquired by said moving picture data acquisition means to a transmission line on a first data band; and differential data transmission means for transmitting redundant data on a second data band.

4. A moving picture reception apparatus comprising:

data reception means for receiving moving picture data from a transmission line on a first data band;

decoding means for decoding the moving picture data received by said data reception means into an image;

display means for displaying the image provided by said decoding means; and differential data reception means for receiving redundant data on a second data band.

5. The moving picture transmission apparatus of claim 3, wherein the moving picture data comprises an I picture and the redundant data comprises recovery data for recovering from an error in receiving the I picture.

6. The moving picture transmission apparatus of claim 5, wherein the recovery data is a P' picture.

7. The moving picture transmission apparatus of claim 5, further comprising time information addition means for adding time information to the I picture and adding said time information to the recovery data.

8. The moving picture reception apparatus of claim 4, wherein the moving picture data comprises an I picture and the redundant data comprises recovery data for recovering from an error in receiving the I picture.

9. The moving picture reception means of claim 8, wherein the recovery data is a P' picture.

10. The moving picture transmission apparatus of claim 8, further comprising error determination means for checking whether a reception error has occurred based on time information transmitted with the I picture and the recovery data.

* * * * *

UNITED STATES PATENT AND TRADEMARK OFFICE
CERTIFICATE OF CORRECTION

PATENT NO. : 6,724,819 B1
DATED : April 20, 2004
INVENTOR(S) : Toshimasa Takaki et al.

It is certified that error appears in the above-identified patent and that said Letters Patent is hereby corrected as shown below:

<u>Title page,</u>
Item [73], Assignee, please delete "Matsushitas", and insert therefor -- Matsushita --.

Signed and Sealed this

Thirty-first Day of August, 2004

JON W. DUDAS
*Director of the United States Patent and Trademark Office*